United States Patent [19]

Tatsunaka et al.

[11] Patent Number: 4,459,123

[45] Date of Patent: Jul. 10, 1984

[54] DRIVING METHOD FOR AUXILIARY MACHINERY OF A VEHICLE

[75] Inventors: Toshiharu Tatsunaka; Akio Nara; Keiji Tsuchiya, all of Okazaki; Tsuyoshi Adachi, Toyota, all of Japan

[73] Assignees: Nippon Soken, Inc., Nishio; Toyota Jidosha Kogyo Kabushiki Kaisha, Toyota, both of Japan

[21] Appl. No.: 351,301

[22] Filed: Feb. 22, 1982

[30] Foreign Application Priority Data

Feb. 28, 1981 [JP] Japan .................................. 56-27613

[51] Int. Cl.[3] ......................... F16H 7/18; F16H 37/00; F16G 51/80

[52] U.S. Cl. ....................................... 474/87; 474/101; 474/273

[58] Field of Search ...................... 474/87, 86, 84, 148, 474/110, 135, 133, 134, 101

[56] References Cited

U.S. PATENT DOCUMENTS

| | | | |
|---|---|---|---|
| 2,910,891 | 11/1959 | Heckethorn | 474/86 |
| 3,296,892 | 1/1967 | Gibson | 474/86 X |
| 3,895,544 | 7/1975 | Suzaki | 474/87 |
| 4,028,955 | 6/1977 | Fisher et al. | 474/87 |
| 4,031,761 | 6/1977 | Fisher et al. | 474/87 X |
| 4,095,579 | 6/1978 | Iwasa et al. | 474/87 X |
| 4,299,583 | 11/1981 | Kraft et al. | 474/110 |

FOREIGN PATENT DOCUMENTS

| | | | |
|---|---|---|---|
| 74819 | 1/1947 | Norway | 474/87 |

*Primary Examiner*—Lawrence J. Staab
*Assistant Examiner*—Michael D. Bednarek
*Attorney, Agent, or Firm*—Cushman, Darby & Cushman

[57] ABSTRACT

Around an engine-body of a vehicle, several auxiliary machinery such as an air-conditioner and a power steering-pump are disposed. Pulleys of said auxiliary machinery are driven by means of an endless belt or endless belts by a driving pulley of the engine. In order to obtain the most effective operation of the engine, consideration should be given to the degree of the power loss for driving the auxiliary machinery.

For this purpose, according to the present invention, the order by which said several driven pulleys are driven by said driving pulley is determined by the magnitude of the driven torques of the corresponding auxiliary machinery along the running direction of the endless belt toward the driving pulley.

2 Claims, 6 Drawing Figures

DRIVING METHOD FOR AUXILIARY MACHINERY OF A VEHICLE

BACKGROUND OF THE INVENTION

The present invention relates to a driving method for automotive vehicles, more particularly to a novel driving method for auxiliary machinery of a vehicle by which the auxiliary machinery may be efficiently operated and by which the power loss for driving thereof may be minimized by the optimum arrangement of the auxiliary machinery.

In conventional practice, auxiliary machinery have been arranged around vehicle engines based on the attachability of said auxiliary machinery to the engine, the effective utilization of space in the engine compartment, and the ease of wiring and piping for the auxiliary machinery.

There are several drawbacks to arranging the auxiliary machinery just on the basis of the above-mentioned items. For example, auxiliary machinery are usually driven by means of a single endless belt driven by a driving pulley. The conventional practice ignores the driven torque magnitudes of the auxiliary machines along the endless belt.

This presents some problems. For example, when an auxiliary machine having a large driven torque is disposed at a relatively downstream portion of the endless belt, it exerts an excess amount of tension on the upstream portion of the endless belt. This results in damage of the bearings of the auxiliary machine disposed at said upstream portion.

Also, the above conventional arrangement of the auxiliary machinery reduces the transmitting efficiency of the endless belt and shortens the life of the endless belt.

SUMMARY OF THE INVENTION

The object of the present invention is to provide a driving method for auxiliary machinery of a vehicle which is substantially free from the aforesaid drawbacks.

The aforesaid object is attained according to the present invention, comprising a driving pulley integrally fixed and turned with a engine crankshaft, several driven pulleys mounted on respective auxiliary machines disposed around said engine, and at least one endless belt for driving said driven pulleys by means of said driving pulley from the crankshaft, characterized in that the order by which said several belt are driven by said driving pulley is determined by the magnitude of the driven torques of the corresponding auxiliary machines along the running direction of the endless belt toward the driving pulley with the driven pulley having the largest driven torque being driven first. In practice, said several driven pulleys are divided into small groups according to the magnitude of the driven torques of the corresponding auxiliary machine with each group being driven by a separate belt. The order by which said the driven pulleys of each group are driven by the driving belt is determined by the magnitude of the driven torques of the corresponding auxiliary machines belonging to each group along the running direction of the corresponding belt toward the driving pulley with the driven pulley having the largest driven torque being driven first.

DETAILED DESCRIPTION OF THE INVENTION

For the sake of understanding the present invention better, before entering into the description of the present invention in detail, a conventional driving method for the auxiliary machinery of a vehicle is hereinafter described with reference to FIGS. 1 through 3.

Figure 1:
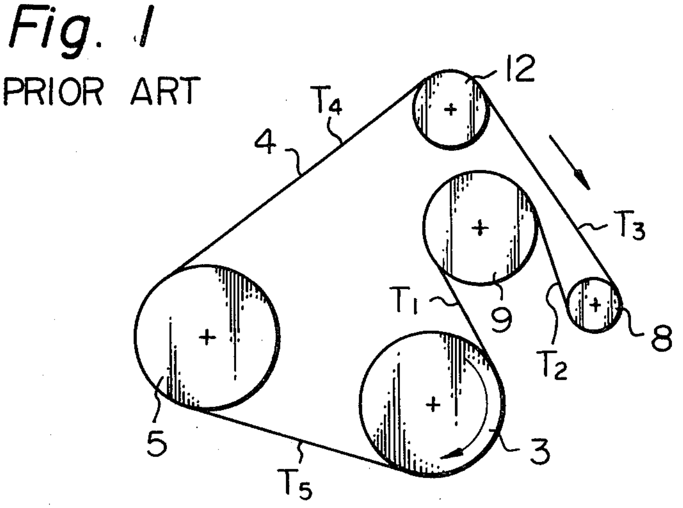
Fig. 1 PRIOR ART
FIG. 1 is a schematic view illustrating an arrangement of auxiliary machinery of the prior art.

FIG. 1 shows a typical arrangement of auxiliary machinery of a vehicle. A single endless belt 4, which transmits drive power from a crankshaft pulley 3, first drives a fan/water-pump pulley 9, then successively drives an alternator pulley 8, an idle pulley 12, and an air-conditioner pulley 5.

Figure 2:
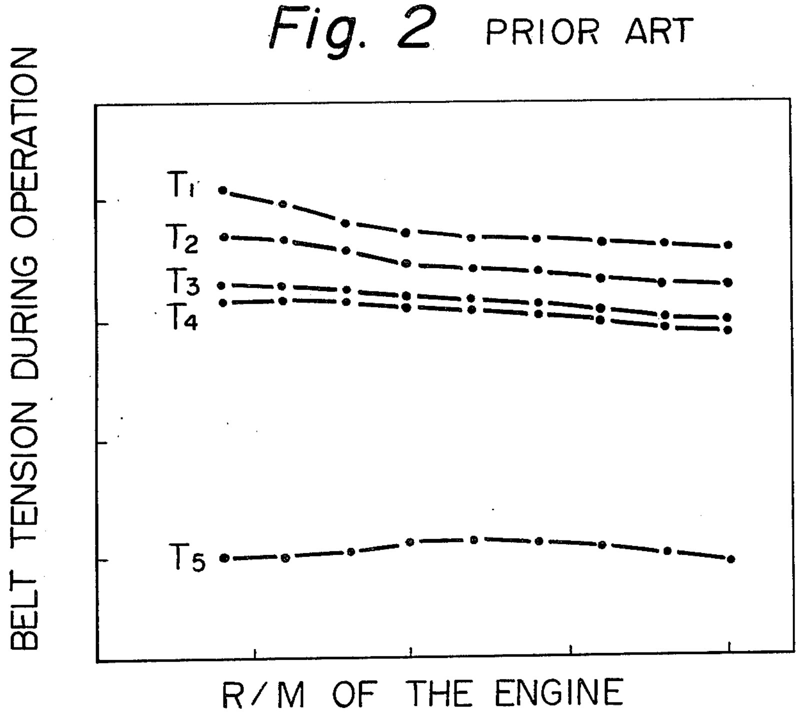
Fig. 2 PRIOR ART
FIG. 2 is a graph showing the test results according to FIG. 1.

FIG. 2 shows variations of tension in the belt during the operation according to the speed of the engine. $T_1$, $T_2$, $T_3$, $T_4$, and $T_5$ are the belt tension between the crankshaft pulley 3 and the fan/water-pump pulley 9, between the fan/water-pump pulley 9 and the alternator pulley 8, between the alternator pulley 8 and the idle pulley 12, between the idle pulley 12 and the air-conditioner pulley 5, and between the air-conditioner pulley 5 and the crankshaft pulley 3, respectively. The tension $T_1$, which is first effected, has the highest magnitude among the tensions $T_1, T_2 \ldots T_5$. The magnitudes of the tensions $T_2, T_3 \ldots T_5$ become progressively lower along the downstream direction of the endless belt 4.

The most remarkable drop in magnitude of tension can be found between $T_4$ and $T_5$. This difference is caused by the driven torque of the auxiliary machinery disposed therebetween, namely, in the arrangement of the auxiliary machinery shown in FIG. 1, the air-conditioner pulley 5 has the highest driven torque.

As can be readily understood from FIG. 1, when the pulley of the auxiliary machine having the largest driven torque, i.e., the air-conditioner pulley 5, is disposed at the downstream portion of the endless belt, an excess amount of tension will be exerted on the portion of the endless belt upstream from said air-conditioner pulley 5, even if the auxiliary machinery at said upstream portion of the endless belt have relatively small driven torques. This can cause damage to the bearings of the auxiliary machinery at said upstream portion of the belt.

Figure 3:
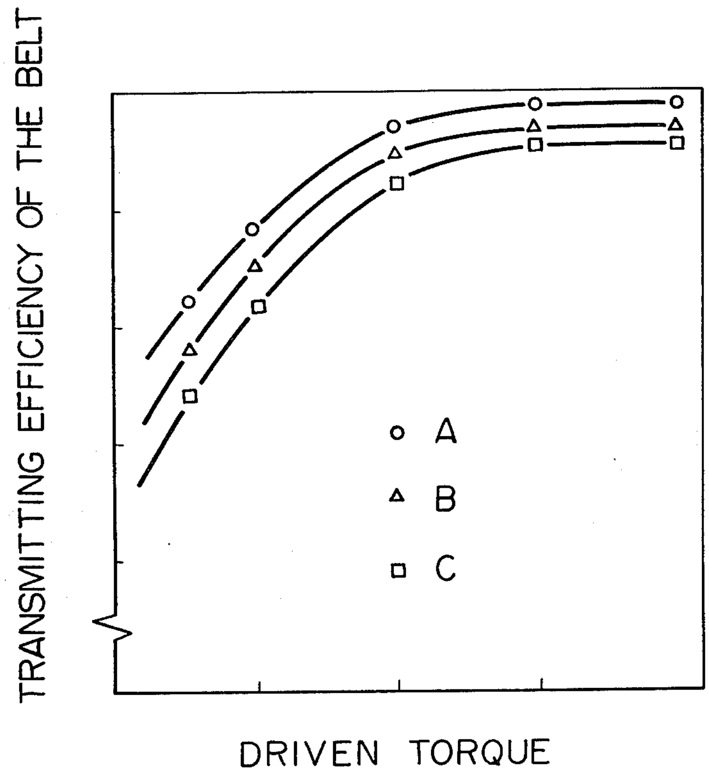
Fig. 3 PRIOR ART
FIG. 3 is a graph showing the test results according to a belt tester similar to FIG. 2.

FIG. 3 shows the transmitting efficiency of endless belts to which are exerted excess amounts of tension, measured by a belt tension-tester (not shown). Three kinds of belt tension, A=20 kg, B=40 kg, and C=60 kg, were applied to the belts. The upper limit of the allowable slip of the endless belts was 0.5%. The smaller the tension of the belt, the higher the transmitting efficiency thereof, whereas the larger the tension of the belt, the lower the transmitting efficiency thereof.

The latter fact is a result of the wedging action of the V-belt into the groove in the pulley.

Preferred embodiments of the invention will now be described in detail with reference to FIGS. 4 through 6, wherein the same reference numerals are used to designate similar parts throughout the different views.

Figure 4:
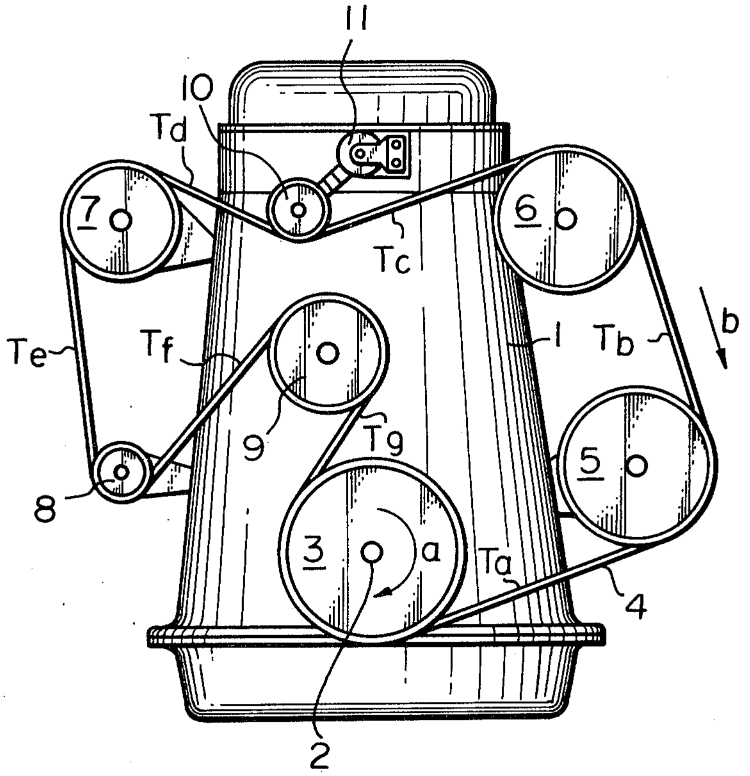
FIG. 4 is a front view of an engine illustrating the first embodiment according to the present invention.

FIG. 4 shows a first embodiment of the present invention. As can be seen in FIG. 4, several auxiliary machines are disposed around an engine-body 1. A crankshaft pulley 3 is integrally secured to a crankshaft 2 which is rotatably mounted on the engine-body 1. The crankshaft pulley 3 rotates in the clockwise direction, indicated by the arrow a, and all the auxiliary machines are driven by a single endless belt 4. This driving system is well known as a serpentine-drive system. The belt 4 moves in the direction indicated by the arrow b by means of the rotation of the crankshaft pulley 3.

The belt 4 first drives an air-conditioner pulley 5, then successively drives a pulley for power steering-pump 6, a pulley for secondary air-pump 7, an alternator pulley 8, and a pulley for fan/water-pump 9. The engine fan is usually mounted on the water pump shaft. This serpentine-drive system is distinguished by the fact that, for example, the pulley for fan/water-pump 9 (disposed at the center of the group of the auxiliary machinery) is driven by the back surface of the belt 4. A belt tension control device 11 having an idle pulley 10 may be disposed on the engine-body 1 so as to adjust the tension of the belt 4, as required.

$T_a$, $T_b$ . . . $T_g$ designate the tension between each adjacent two of said auxiliary machines. The magnitude of the tension $T_a$ is almost independent of the order of arrangement of the auxiliary machinery, except when the total driven torque of the auxiliary machinery is changed. On the other hand, the magnitude of the tensions $T_b$, $T_c$ . . . may considerably vary according to their order of arrangement and the reduction of the tensions $T_b$ and $T_c$ below $T_a$ are considerably large.

That is to say, when an auxiliary machine having a large driven torque is disposed closest to the driving pulley in the direction of movement of the belt, the magnitude of the tensions of the successive auxiliary machines become smaller. Thus, the larger the magnitude of the driven torque of the air-conditioner, the smaller the magnitude of the tensions $T_b$, $T_c$. . . . Since the driven torques of the auxiliary machinery (6, 7, 8, and 9) are relatively small, the tensions ($T_d$, $T_e$, $T_f$, and $T_g$) are small and the changes in the tensions ($T_d$, $T_e$, $T_f$, and $T_g$) are relatively small. The special arrangement of the auxiliary machinery therefore enables each of the auxiliary machines to be driven by the minimum necessary tension.

Figure 5:
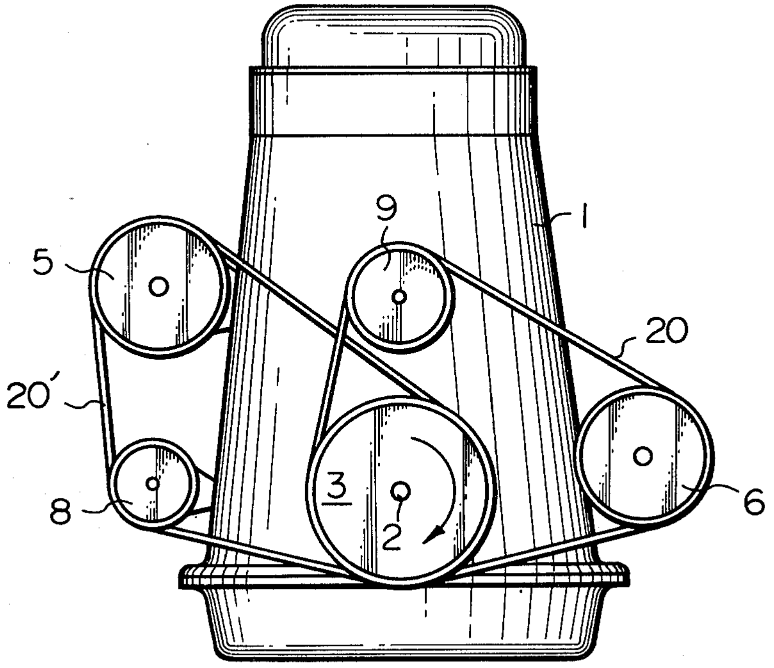
FIG. 5 is a front view of an engine illustrating the second embodiment according to the present invention.

FIG. 5 illustrates a second embodiment of the present invention. Two endless belts 20 and 20′ are utilized to drive all the auxiliary machinery.

One belt 20 drives a pulley for power steering-pump 6 and a pulley for fan/water-pump 9, whereas the other belt 20′ drives an air-conditioner pulley 5 and an alternator pulley 8. The power steering-pump and the air-conditioner belong to the first group of auxiliary machinery, and the fan/water-pump and the alternator belong to the second group. The driven torque of the said first group is larger than that of said second group. The first group is disposed close to the crankshaft pulley 3 along the direction of movement of the belt, whereas the second group is disposed further from the crankshaft pulley 3, in both belts 20 and 20′.

Figure 6:
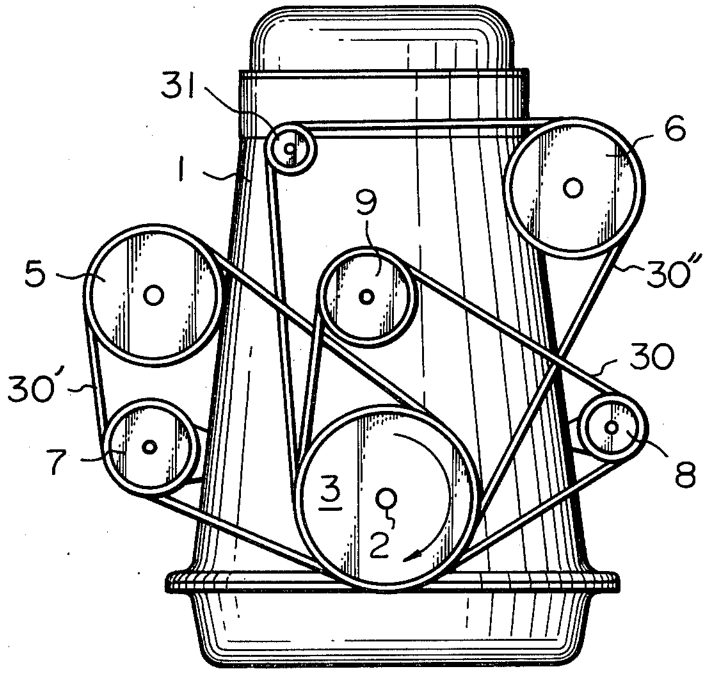
FIG. 6 is a front view of an engine illustrating the third embodiment according to the present invention.

FIG. 6 illustrates a third embodiment of the present invention. Three endless belts 30, 30′ and 30″ are utilized to drive all the auxiliary machinery. The belt 30 drives an alternator pulley 8 and then drives a pulley for fan/water-pump 9. However, since both of said auxiliary machinery belong to the second group, i.e., the auxiliary machinery having small driven torques, there is no concern regarding their order of arrangement. The belt 30′ first drives an air-conditioner pulley 5 belonging to the first group, then drives a pulley for the secondary air-pump 7 belonging to the second group. The belt 30″ first drives a pulley for power steering-pump 6 belonging to the first group, then drives an idle pulley 31 belonging to the second group.

In the second and the third embodiments, the use of several endless belts (20, 20′; 30, 30′, 30″) allows the driven torque exerted to the belt to be reduced. Also, the increased contact angle between the belt and the pulley for the auxiliary machinery enables securer transmission of the driving power of the crankshaft as well as longer life of the belt in comparison with the first embodiment of the present invention.

As will readily be understood from the foregoing description, in the arrangement of auxiliary machinery according to the present invention, the crankshaft pulley first drives the auxiliary machinery having the largest driven torque, then successively drives the auxiliary machinery having smaller drive torques. This enables each auxiliary machinery to be driven by exerting the minimum necessary tension. And the driving power from the crankshaft to be transmitted to each auxiliary machinery at a high efficiency. This in turn enables minimization of fuel consumption. Furthermore, since the belt is not subjected to excessive tension, the life of the belt can be prolonged for more economy.

The invention has been described in detail with particular reference to the preferred embodiments thereof, but it will be understood that reasonable variations and modifications are possible without departing from the spirit and basic scope of the invention.

We claim:

1. In a vehicle having an engine, a driving pulley for auxiliary machinery turned by said engine, at least four auxiliary machines divided into at least two groups of at least two machines, each machine of each group having a driven pulley and one machine of each group having a driven torque larger than the other machine of that group, and at least two endless belts each trained over said driving pulley and separately over all the driven pulleys of the machines of one of said groups for driving the machines of that group by said engine, characterized in that:

the order by which said driven pulleys of the machines of each group are driven by said driving pulley corresponds to a descending order of the magnitudes of the driven torques of said auxiliary machines of that group with said one machine having the larger driven torque being driven first by said belt, i.e. the driven pulley of said one machine is located closest to said driving pulley, along the path of said belt, upstream of said driving pulley relative to the direction of movement of said belt.

2. The structure set forth in claim 1 wherein said auxiliary machines include a compressor for an air-conditioner, a power steering-pump, a secondary air-pump, a fan/water-pump, and an alternator.

* * * * *